United States Patent [19]

Gute

[11] Patent Number: 5,061,331
[45] Date of Patent: Oct. 29, 1991

[54] ULTRASONIC CUTTING AND EDGE SEALING OF THERMOPLASTIC MATERIAL

[75] Inventor: Robert M. Gute, Corunna, Mich.

[73] Assignee: Plasta Fiber Industries, Inc., Marlette, Mich.

[21] Appl. No.: 539,560

[22] Filed: Jun. 18, 1990

[51] Int. Cl.⁵ ............................................. B32B 31/18
[52] U.S. Cl. ..................... 156/64; 156/73.1; 156/73.3; 156/88; 156/251; 156/267; 156/353; 156/359; 156/362; 156/515; 156/571; 156/580.1; 156/580.2; 425/174.2; 264/23; 901/40; 901/42
[58] Field of Search ........................ 156/73.1, 73.3, 88, 156/267, 251, 515, 580.1, 580.2, 353, 359, 362, 571, 574, 64; 425/174.2; 264/23; 901/40, 42

[56] References Cited

U.S. PATENT DOCUMENTS

| | | | |
|---|---|---|---|
| 3,457,132 | 7/1969 | Tuma et al. | 156/515 |
| 3,657,033 | 4/1972 | Sager | 156/580.2 X |
| 4,157,719 | 6/1979 | DeWoskin | 156/580.2 X |
| 4,224,091 | 9/1980 | Sager | 156/73.3 |
| 4,392,257 | 7/1983 | Furga | 156/251 X |
| 4,491,491 | 1/1985 | Stumpf | 156/73.3 |
| 4,496,407 | 1/1985 | Lowery, Sr. et al. | 156/580.1 X |
| 4,534,819 | 8/1985 | Payet et al. | 156/580.2 X |
| 4,560,427 | 12/1985 | Flood | 156/580.2 X |
| 4,610,750 | 9/1986 | Mango | 156/580.2 X |
| 4,630,987 | 12/1986 | Poersch et al. | 901/40 X |
| 4,693,771 | 9/1987 | Payet et al. | 156/580.2 X |
| 4,750,970 | 6/1988 | Malosh | 156/580.1 |
| 4,804,432 | 2/1989 | Jurrius et al. | 156/251 X |
| 4,896,014 | 1/1990 | Sakai et al. | 901/42 X |
| 4,900,379 | 2/1990 | Chapman | 156/353 X |
| 4,927,479 | 5/1990 | Böck | 156/583.1 X |

Primary Examiner—David A. Simmons
Assistant Examiner—J. Sells
Attorney, Agent, or Firm—Brooks & Kushman

[57] ABSTRACT

An apparatus for cutting and sealing the cut edges of semipermeable and at least partially thermoplastic fabric material is disclosed as having a support to position the material for cutting and sealing, a vacuum system to secure the material to the support to immobilize the material while the latter is being cut and sealed, an ultrasonic cutter to cut the material and to seal cut edges to prevent raveling thereof, and a guide to direct the cutter to cut the material in a desired configuration. The apparatus may be particularly adapted to cut and seal cut edges of automotive safety air bag material.

36 Claims, 4 Drawing Sheets

ULTRASONIC CUTTING AND EDGE SEALING OF THERMOPLASTIC MATERIAL

TECHNICAL FIELD

This invention relates to ultrasonic cutters that cut and seal the cut edges of semipermeable, thermoplastic fabric materials such as automotive safety air bag material.

BACKGROUND ART

Devices for cutting and sealing cut edges of thermoplastic materials have been known for some time. Refer, for example, to U.S. Pat. No. 4,534,819 to Payet and Ballard for an apparatus and process for cutting and sealing a woven textile fabric having thermoplastic fibers to prevent the fabric from raveling after repeated washings. Disclosed are an anvil in the form of a roller having a doubly beveled peripheral surface, an ultrasonic cutting and sealing device, and material feeding means. Also disclosed are material feeding speed, anvil angle, cutting device frequency and anvil-cutting device spacing. U.S. Pat. No. 4,693,771, also to Payet and Ballard, discloses a similar apparatus and process.

U.S. Pat. No. 4,496,407 to Lowery and Payet discloses an apparatus and process for ultrasonically cutting off undesirable selvage and sealing the edge using a stationary cutter while moving the fabric for processing one edge and using a laterally movable cutter while moving the fabric for simultaneously processing an opposite edge. Also disclosed are a hydraulic fabric shifter and process and position sensors.

Another apparatus for ultrasonically cutting and sealing sheet workpieces together is disclosed in U.S. Pat. No. 3,657,033 to Sager. This apparatus includes an anvil having an inclined surface and a blade having a radius contacting edge. When ultrasonically vibrated, the blade applies a component of force acting perpendicularly to the contacting edge of the blade and a component of force acting parallel to the inclined surface of the anvil to simultaneously seal and cut material as it moves along between the blade and the anvil. The blade and anvil may also be moved relative to the material.

U.S. Pat. No. 3,457,132 to Tuma and Gafvert disclose an apparatus for cutting and heat sealing two webs of material together using a heated member, which may be ultrasonically heated, having different surface temperatures at different areas of its surface, a hot central area being used to cut material and lateral areas of lower temperatures to heat and seal together sheet material pressed thereby.

U.S. Pat. No. 4,157,719 to DeWoskin discloses an apparatus including shaped cutting edges that cut material adjacent that portion thereof being sealed by an ultrasonic horn acting against an anvil. The cut material is blown away.

Several devices introduce a separate, thermoplastic thread to cutting and sealing areas to facilitate the sealing of nonthermoplastic materials. For example, U.S. Pat. No. 4,560,427 to Flood discloses an ultrasonic sealing and cutting method and apparatus having a roller-shaped anvil. The anvil has a doubly beveled peripheral surface forming a centrally disposed cutting edge. A thermoplastic thread is fed through a cutting station with the fabric, proximate one beveled surface of the anvil, to be fused with the fabric. This allows low-thermoplastic-content material to be sealed.

Another example of the use of thermoplastic thread is U.S. Pat. No. 4,610,750 to Mango, which discloses an ultrasonic cut and seal apparatus having a roller-shaped anvil. The apparatus includes a cutter having a removable tip the longitudinal axis of which is offset somewhat from the axis of rotation of the roller. The tip defines therein an inclined bore through which a thermoplastic filament is fed to be fused with sheet material being cut and sealed.

U.S. Pat. No. 4,224,091 to Sager discloses a method for producing a corner in thermoplastic material using ultrasonically cutting and sealing.

U.S. Pat. No. 4,491,491 discloses an ultrasonic separation apparatus for simultaneously cutting and sealing thermoplastic material. Included is a resilient cutter mounting. The apparatus may be particularly adapted to cut strings of pocketed coil springs.

While each of these cutters and sealers functions with a certain degree of efficiency, none disclose the advantages of the improved ultrasonic cutting and sealing system of the present invention as is hereinafter more fully described.

DISCLOSURE OF INVENTION

An object of the present invention is to provide an improved ultrasonic cutting and sealing apparatus that cuts material to a desired configuration by using a cutting device that is moved and guided along a prescribed path while the material is held immobilized by a negative pressure.

Another object of the present invention is to provide an improved ultrasonic cutting and sealing apparatus that automatically positions material to be cut, picks up and stacks cut material and also retrieves and stores material remnants.

In realizing the aforementioned and other objects, the ultrasonic cutting and sealing apparatus of the present invention includes a support to position material for cutting and sealing. The support is a substantially flat, generally horizontal platform.

Associated with the platform is a vacuum means for securing the material to the platform to immobilize the material while it is being cut and sealed. An embodiment of the present invention includes a vacuum means having a platform defining a plurality of apertures therein. The apertures are connected to a source of vacuum so that material disposed atop the platform is held thereagainst by the vacuum. A securing vacuum controlling means including a vacuum controller applies vacuum to the apertures in the platform whenever material is being cut and sealed.

Although the apparatus of the present invention is perfectly capable of operating with material that is impermeable, it is particularly adapted to cutting and sealing cut edges of automotive safety bag material. Such material is semipermeable, offering sufficient resistance to a flow of air therethrough to facilitate a rapid inflation of an air bag made therefrom but permitting air to exit at a rate sufficient to allow a rapid deflation of the air bag.

Alternative material securing means include a shaped weight to press the material against the platform and nontransferring adhesive disposed on the platform to temporarily adhere material being supported thereby.

The present invention also includes cutting means having an ultrasonic cutter to cut the material and to seal cut edges to prevent their raveling. An embodiment of the present invention includes an ultrasonic cutter that is manually positioned. The cutter includes an ultrasonically driven horn, which has a cutting tip. The cutter also has a guide member attached thereto, the guide member and the cutting tip having collinear axes. Also attached to the cutter, in effective apposition thereto, is an anvil. The anvil and the guide member may be formed as one integral part.

The platform may have guide rails disposed thereon to function as a guiding means in cooperation with the guide member attached to the cutter. More preferably, however, the platform of this embodiment defines a channel formed therein to function as a guiding means for the cutter. The guide member attached to the cutter fits into the channel, which describes a path coincident with the shape to be cut from the material. As the cutter is manually propelled, the guide member, and the cutter to which it is attached, follow the path defined by the channel, cutting the material in a desired configuration.

Another embodiment of the present invention includes an ultrasonic cutter that is positioned by a robotic cutting arm. The arm has three degrees of freedom in which to guide the cutter along a two-dimensional cutting path. The embodiment also includes cutting arm controlling means having a cutting arm controller to control the movement of the robot cutting arm.

The present invention also includes a feeding means for feeding material onto the platform to position the material for cutting. The feeding means includes a supply reel rotatably mounted proximate a foot end of the platform to store a quantity of material rolled on the supply reel and to permit material to be pulled from the supply reel for positioning and cutting. A takeup reel is rotatably mounted proximate a head end of the platform to receive and store material remaining after a desired portion has been cut therefrom.

The feeding means also includes a drive means, including a motor, connected to the takeup reel to rotate it, pulling uncut material from the supply reel, positioning the uncut material on the platform, and winding material remaining onto the takeup reel. A motor may also be connected to the supply reel to rotate it. The drive means also includes a motor control means, or feed controller, connected to the motors to initiate and terminate rotation of the takeup reel and the supply reel.

Mounted between the supply reel and the platform is a plurality of ultrasonic cutters for longitudinally slitting and sealing the edges of material as it is unrolled from the supply reel to thereby separate the material into a desired number of strips before the material is positioned on the platform. The cutters are laterally adjustable to facilitate cutting the material into strips of desired widths. Each cutter includes an ultrasonically driven horn that impinges a hardened steel anvil rotatably mounted in effective apposition thereto.

Also included in the present invention is a robotic stacking arm having a pickup means for temporarily coupling the robotic stacking arm to a portion cut from the material to facilitate removal of the latter from the platform. The pickup means includes at least one pickup member positionable by the robotic stacking arm against the portion cut from the material. The pickup member is connected to a source of vacuum, the vacuum being communicated through an orifice in the pickup member to hold the portion cut from the material against the pickup member.

The pickup means also includes a pickup controlling means for controlling the application of vacuum to the pickup member. The pickup controlling means, or pickup controller, controls the movement of the robotic stacking arm and controls the application of vacuum to the pickup member to pick up the portion cut from the material.

At least one bin is also provided to receive and store portions cut from the material. The robotic stacking arm positions the pickup member against a portion cut from the material, vacuum is applied to the pickup member to hold the cut material against it, the robotic stacking arm moves the pickup member and the cut material held thereagainst away from the platform to a position above the bin, and vacuum is removed from the pickup member, allowing the cut material to fall into the bin.

An embodiment of the present invention that is an alternative to that including the robotic stacking arm has a pickup member mounted on the robotic cutting arm so that the latter can position the cutter to cut and seal a desired portion of the material and then pick up the cut material and deposit it in the bin. As in the previously described embodiment, a pickup controller applies and removes vacuum to the pickup member.

An embodiment of the present invention that is an alternative to that including a cutter-mounted anvil includes a configured anvil disposed on the platform. The anvil has a shape coincident with a path traced by the cutting tip when cutting material to a desired configuration, a portion of the anvil being in effective apposition to the cutting tip whenever the cutting tip in engaged in cutting. Still another embodiment includes a platform having a substantial portion of its upper surface formed of a material sufficiently hard to function as an anvil.

Yet another embodiment of the present invention includes a platform having at least one slightly raised, hardened steel energy director, or anvil, shaped to match portions to be cut from the material. In this embodiment, the ultrasonically driven horn used, rather than having a cutting tip, includes a flat plate for simultaneously pressing material disposed between the plate and the anvil against all portions of the raised anvil and cutting and sealing the material; and the cutter need have only one degree of freedom and need not be guided along a path coincident with the configuration of the portions to be cut from the material.

Another embodiment of the present invention includes a ultrasonic cutter that is positioned by a cutter positioning mechanism having a longitudinal positioning means, or mechanism, for horizontally moving the cutter along a longitudinal axis to provide longitudinal components of motion to the cutter; a lateral positioning means, or mechanism, for horizontally moving the cutter along a lateral axis to provide lateral components of motion to the cutter, the lateral axis being at right angles to the longitudinal axis; and a vertical positioning means, or mechanism, for vertically moving the cutter into engagement with material to be cut and out of engagement with the material when cutting has been completed.

The objects, features and advantages of the present invention are readily apparent from the following detailed description of the best mode for carrying out the invention when taken in connection with accompanying drawings.

BRIEF DESCRIPTION OF DRAWINGS

In the drawings, in which like reference characters indicate corresponding parts in all the views.

BEST MODE FOR CARRYING OUT THE INVENTION

Figure 1:
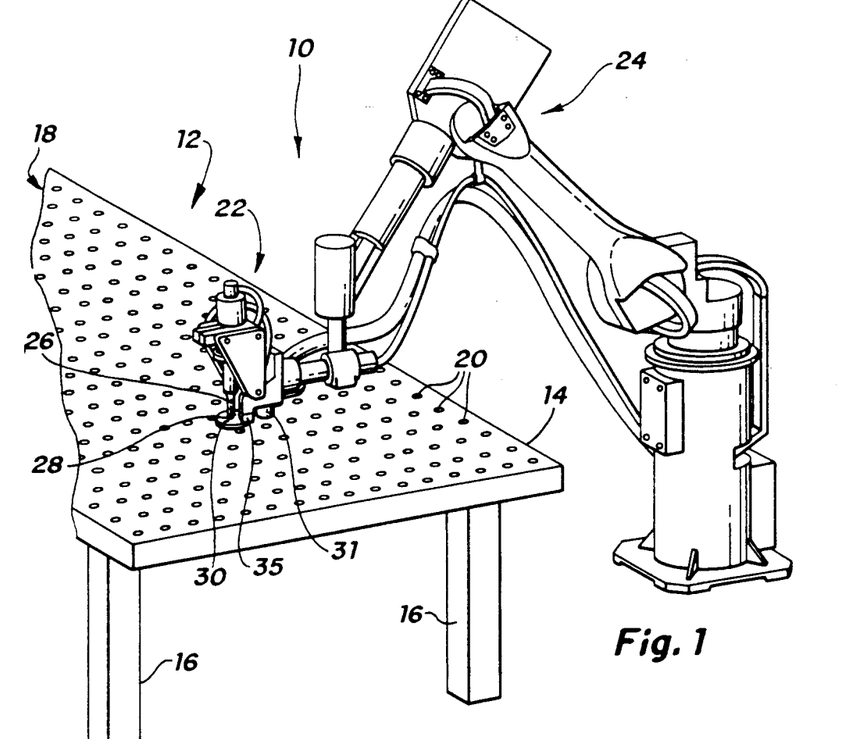
FIG. 1 is a partial, perspective view of an ultrasonic edge cutting and sealing apparatus embodying features of the present invention.

With reference to FIG. 1 of the drawings, shown is an ultrasonic cutting and sealing apparatus, generally indicated by reference numeral 10, for cutting and sealing the cut edges of semipermeable and at least partially thermoplastic fabric material. The apparatus 10 includes a support, generally indicated by reference number 12, for positioning the material for cutting and sealing. The support 12 includes a substantially flat, generally horizontal platform 14 mounted on a plurality of supporting legs 16 or the like.

Included in a vacuum means, generally indicated by reference number 18, is a plurality of apertures 20 are shown formed in the platform 14. The apertures are connected to a source of vacuum (not shown). The apertures 20 are spaced about the platform 14 so that, when vacuum is applied to the apertures 20, material resting atop the platform 14 is pulled thereagainst and immobilized while being cut and sealed.

Although the present apparatus is perfectly capable of operating with material that is impermeable, it is particularly adapted to cutting and sealing cut edges of automotive safety bag material. Such material is semipermeable, offering sufficient resistance to a flow of air therethrough to facilitate a rapid inflation of an air bag made therefrom but permitting air to exit at a rate sufficient to allow a relatively rapid deflation of the air bag. The material typically used with the present invention has a permeability within a range that permits the material to be held in place by a vacuum not exceeding 74 inches of water.

An ultrasonic cutter, generally indicated by reference numeral 22, is shown mounted on a robotic cutting arm, generally indicated by reference numeral 24. The cutter 22 includes an ultrasonically driven horn 26, which has a cutting tip 28. The cutter 22 also has an anvil 30. The robotic cutting arm 24 is mounted proximate the platform 14 and is articulated to provide three degrees of freedom in which to guide the cutter 22 along a two-dimensional cutting path.

Shown attached to the cutter 22 is a pickup member 31. The pickup member 31 is connected to a source of vacuum (not shown). After a portion of material is cut and sealed, the robotic cutting arm 24 may be positioned over the cut portion and vacuum applied to the pickup member 31, pulling the material thereagainst. The robotic cutter arm 24 may then be maneuvered to lift the cut portion and remove it from the platform 14.

Figure 2:
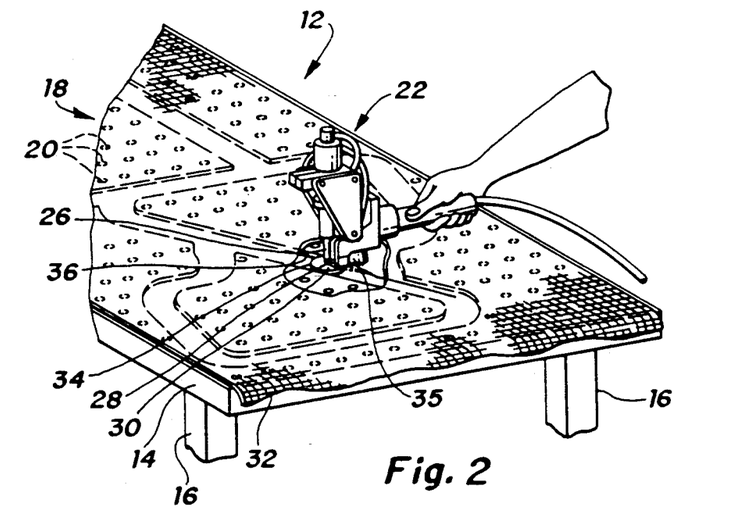
FIG. 2 is a partial, perspective view showing details of another embodiment of the present invention.

FIG. 2 of the drawings shows another embodiment of the present invention. This embodiment includes a support, generally indicated by reference numeral 12, for positioning material 32 for cutting and sealing. The support 12 includes a substantially flat, generally horizontal platform 14 mounted on a plurality of supporting legs 16 or the like. Defined in the platform 14 are a plurality of apertures 20 connected to a source of vacuum (not shown) that pulls the material 32 against the platform 14 to immobilize the material 32 while it is being cut and sealed.

A cutter, generally indicated by reference numeral 22, is shown as it would typically be manually operated. The cutter 22 includes an ultrasonically driven horn 26, which has a cutting tip 28. The cutter 22 also has a guide member 34 attached thereto with a bracket 35. The guide member 34 is substantially circular in horizontal cross section, and it and the cutting tip 28 have collinear axes. An anvil 30 is formed as an integral part of the guide member 34.

The platform 14 of this embodiment defines a channel 36 formed therein to function as a guiding means for the cutter 22. The guide member 34 attached to the cutter 22 fits into the channel 36, which describes a path coincident with the shape to be cut from the material 32. As the cutter 22 is manually propelled, the guide member 34, and the cutter 22 to which it is attached, follow the path defined by the channel 36, cutting the material 32 in a desired configuration. The circularity of the horizontal cross section of the guide member 34 maintains the cutting tip 28 in the center of the channel 36 regardless of the orientation of the cutter 22.

Figure 3:
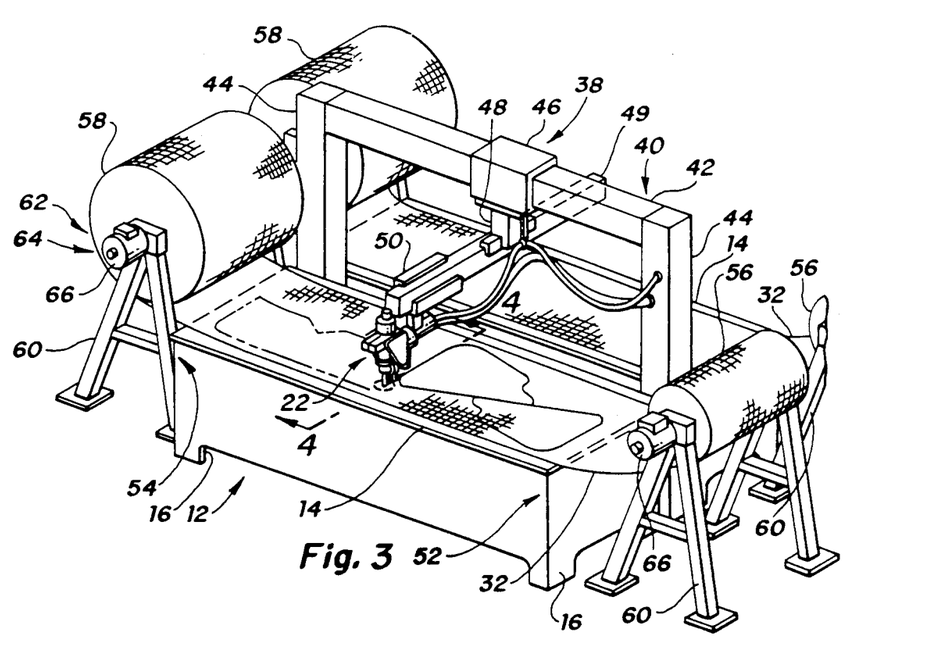
FIG. 3 is a partial, perspective view of yet another embodiment of the present invention.

Shown in FIG. 3 of the drawings is another embodiment of the present invention. This embodiment includes a cutter positioning mechanism, generally indicated by reference numeral 38. The cutter positioning mechanism 38 includes a gantry support, generally indicated by reference numeral 40, which includes an elongate bridge member 42 horizontally supported at each end by a gantry leg 44. Movably mounted on the bridge 42 is a longitudinal positioning means, or mechanism 46, that horizontally moves a cutter, generally indicated by reference numeral 22, along a longitudinal axis to provide longitudinal components of motion to the cutter 22.

Movably mounted on the longitudinal positioning mechanism 46 is a vertical positioning means, or mechanism 48, that vertically moves the cutter 22 into engagement with material 32 to be cut and out of engagement with the material 32 when cutting has been completed. Secured to the vertical positioning mechanism 48 is a beam 49 extending at right angles to the bridge member 42. Movably mounted on the beam 49 is a lateral positioning means, or mechanism 50, that horizontally moves along a lateral axis to provide lateral components of motion to the cutter 22. The lateral axis is at right angles to the longitudinal axis.

As described in the previous embodiments, this embodiment includes a support, generally indicated by reference number 12, for positioning the material 32 for cutting and sealing. The support 12 includes a substantially flat, generally horizontal platform 14 mounted on a plurality of supporting legs 16 or the like. A vacuum means as previously described is also included in the embodiment for immobilizing the material while being cut and sealed.

Alternative methods for immobilizing material to be cut and sealed include a shaped weight (not shown) to press the material 32 against the platform 14 and non-transferring adhesive (also not shown) disposed on the platform 14 to temporarily adhere material 32 being supported thereby.

The platform 14 has a foot end and a head end, generally indicated by reference numerals 52 and 54 respectively. A supply reel 56 is rotatably mounted proximate the foot end 52 of the platform 14, and a takeup reel 58 is rotatably mounted proximate the head end 54. As shown, the reels 56 and 58 may be mounted on A-frame supports 60 or the like. The supply reel 56 and the takeup reel 58 form part of a feeding means, or mechanism, generally indicated by reference numeral 62. A quantity of material 32 is stored on the supply reel 56 and may be pulled therefrom for positioning and cutting atop the platform 14. The takeup reel 58 receives and stores material 32 remaining after a desired portion has been cut therefrom.

The feeding mechanism 62 also includes a drive means, or mechanism, generally indicated by reference numeral 64. The drive mechanism 64 includes electric motors 66, a motor 66 being connected to each reel 56 and 58 to impart rotation thereto when positioning or removing material 32.

As indicated by FIG. 3, provision may be made for operating more than one cutter 22 simultaneously. In the figure, there is only one gantry support 40 and on one longitudinal positioning mechanism 46, but there are pairs of other essential elements of the embodiment. Only one cutter 22 and one lateral positioning mechanism 50 are shown mounted on the beam 49 for the sake of clarity, however.

Figure 4:
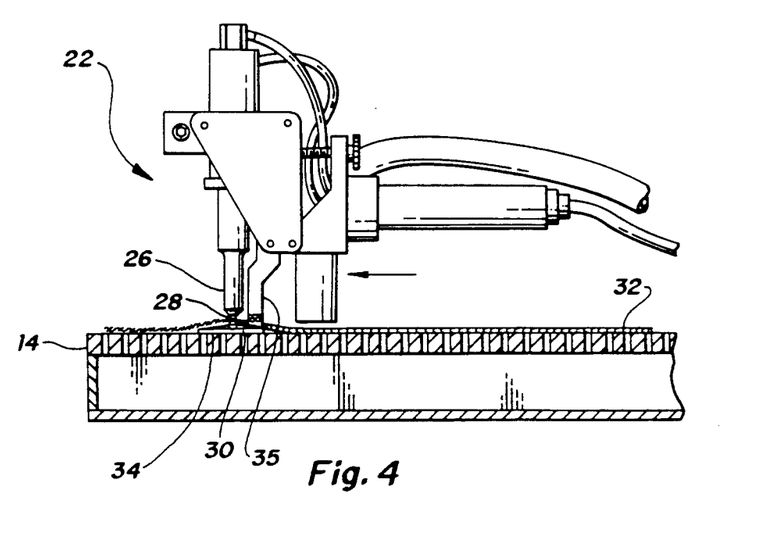
FIG. 4 is a view, partly in section, taken along line 4—4 of FIG. 3.

FIG. 4 is a view, taken along the line 4—4 of FIG. 3, of the cutter 22. Shown is the cutter 22 and portions of the platform 14 and material 32, the latter two items being shown in section. The cutter 22 is shown including an ultrasonically driven horn 26 having a cutting tip 28. An anvil 30 is formed as an integral part of a guide member 34, which is attached to the cutter 22 by a bracket 35. Apertures 20 are shown formed in the platform 14. The apertures 20 are connected to a source of vacuum (not shown). The apertures 20 are spaced about the platform 14 so that, when vacuum is applied to the apertures 20, material 32 resting atop the platform 14 is pulled thereagainst and immobilized while being cut and sealed.

Figure 5:
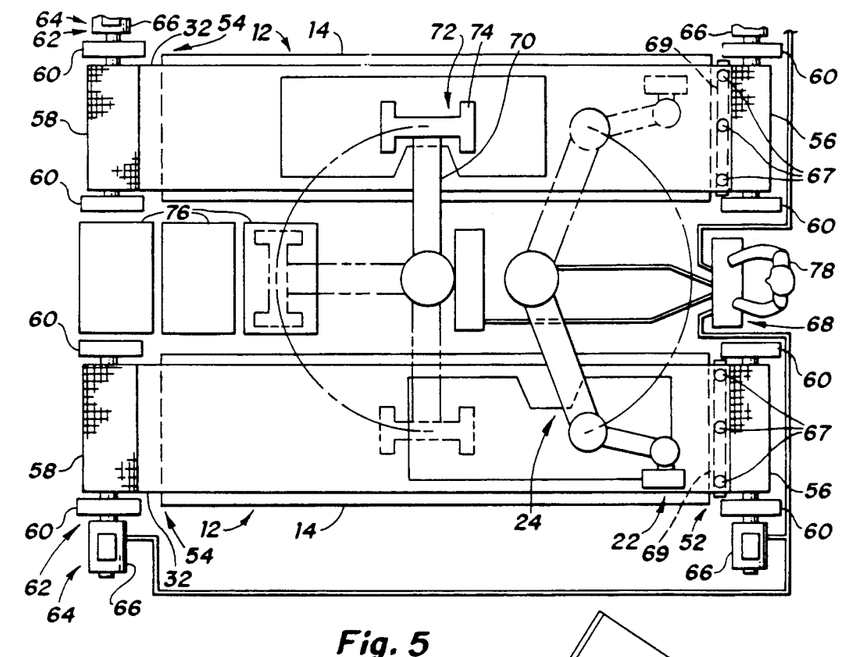
FIG. 5 is a partial, plan view, partly diagrammatic, of still another embodiment of the present invention.

With reference to FIG. 5, shown is an additional embodiment of the present invention. This embodiment includes a support, generally indicated by reference number 12, for positioning the material 32 for cutting and sealing. The support 12 includes a substantially flat, generally horizontal, hardened steel platform 14.

Although not visible in this figure, the embodiment includes vacuum means having apertures defined in the hardened steel platform 14 and connected to a source of vacuum. As in previously described embodiments, the apertures are spaced about the platform 14 so that, when vacuum is applied, material 32 resting atop the platform 14 is pulled thereagainst and immobilized while being cut and sealed.

An ultrasonic cutter, generally indicated by reference numeral 22, is shown mounted on a robotic cutting arm, generally indicated by reference numeral 24. The cutter 22 is not shown in detail in this figure but is as described in previous embodiments, including an ultrasonically driven horn having a cutting tip. The hardened steel portion of the platform 14 serves as an anvil. The robotic cutting arm 24 is mounted proximate the platform 14 and is articulated to provide three degrees of freedom in which to guide the cutter 22 along a two-dimensional cutting path.

A cutter controller is included to control the operation of the robotic cutting arm 24 and the cutter 22. The embodiments of the present invention include one or more controllers, and these may be disposed in separate, interconnected enclosures; however, as shown in FIG. 5, they are represented as being disposed in one enclosure, generally indicated by reference numeral 68.

The platform 14 has a foot end and a head end, generally indicated by reference numerals 52 and 54 respectively. A supply reel 56 is rotatably mounted on an A-frame support 60 proximate the foot end 52 of the platform 14, and a takeup reel 58 is similarly rotatably mounted proximate the head end 54. As shown, the reels 56 and 58 may be mounted on A-frame supports 60 or the like. The supply reel 56 and the takeup reel 58 form part of a feeding means, or mechanism, generally indicated by reference numeral 62. A quantity of material 32 is stored on the supply reel 56 and may be pulled therefrom for positioning and cutting atop the platform 14. The takeup reel 58 receives and stores material 32 remaining after a desired portion has been cut therefrom.

The feeding mechanism 62 also includes a drive means, or mechanism, generally indicated by reference numeral 64. The drive mechanism 64 includes electric motors 66, a motor 66 being connected to each reel 56 and 58 to impart rotation thereto when positioning or removing material 32.

The drive means 64 also includes a motor control means, or feed controller, connected to the motor 66 to initiate and terminate rotation of the takeup reel 58 and the supply reel 56. As previously mentioned, controllers are represented in FIG. 5 as being disposed in one enclosure, generally indicated by reference numeral 68.

Mounted between the supply reel 56 and the platform 14 is a plurality of ultrasonic cutters 67 for longitudinally slitting and sealing the edges of material 32 as it is unrolled from the supply reel 56 to thereby separate the material 32 into a desired number of strips before the material 32 is positioned on the platform 14. The cutters 67 are laterally adjustable to facilitate cutting the material 32 into strips of desired widths. Each cutter 67 includes an ultrasonically driven horn (not shown) that impinges a hardened steel anvil 69 rotatably mounted in effective apposition thereto.

Also included in this embodiment is a robotic stacking arm 70 having a pickup means, generally indicated by reference numeral 72, for temporarily coupling the robotic stacking arm 70 to a portion cut from the material 32 to facilitate removal of the latter from the platform 14. The pickup means 72 includes at least one pickup member 74 positionable by the robotic stacking arm 70 against the portion cut from the material 32. The pickup member 74 is connected to a source of vacuum, the vacuum being communicated through an orifice in the pickup member 74 to hold the portion cut from the material 32 against the pickup member 74.

The pickup means also includes a pickup controlling means for controlling the application of vacuum to the pickup member. The pickup controlling means, or pickup controller, controls the movement of the robotic stacking arm 70 and controls the application of vacuum to the pickup member 74 to pick up the portion cut from the material 32. As previously mentioned, controllers are represented in FIG. 5 as being disposed in one enclosure, generally indicated by reference numeral 68.

As will be understood by anyone skilled in the art, original operating parameters may be manually selected or input to the controller 68, as suggested by the FIG. 78; or, if a number of such cutting installations are being operated at one site, a master controller might be used to input such data to controllers located at each installation.

At least one bin 76 is provided to receive and store portions cut from the material 32. The robotic stacking arm 70 positions the pickup member 74 against a portion cut from the material 32, vacuum is applied to the pickup member 74 to hold the cut material against it, the robotic stacking arm 70 moves the pickup member 74 and the cut material held thereagainst away from the platform 14 to a position above the bin 76; and vacuum is removed from the pickup member 74, allowing the cut material to drop into the bin 76.

As indicated by FIG. 3, provision may be made for operating more than one cutter 22 simultaneously; and such an embodiment is illustrated by FIG. 5. Dashed lines are used in FIG. 5 to show one possible mode of operation, which would include positioning the robotic cutting arm 24 above the material 32 on one platform 14 while the robotic stacking arm 70 is positioned above the material 32 on the other platform 14. While the material 32 on one platform 14 is being out, the material previously cut on the other platform 14 is being removed.

Figure 6:
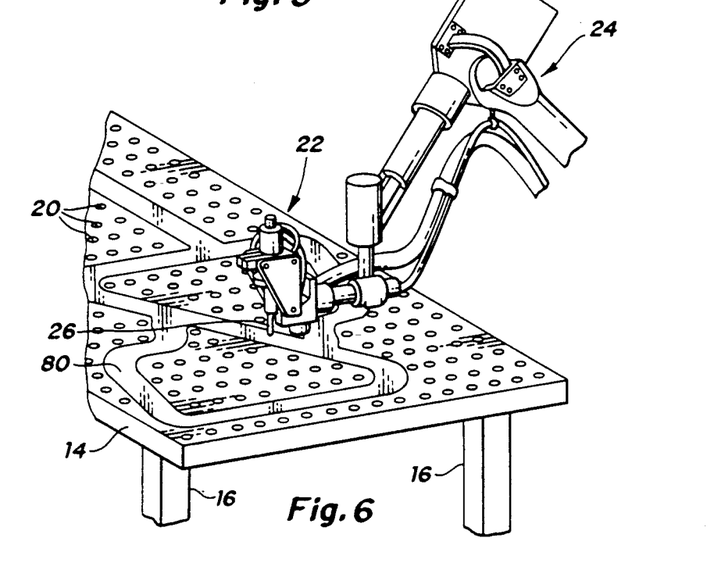
FIG. 6 is a partial, perspective view showing details of another embodiment of the present invention.

FIG. 6 includes details illustrating another embodiment of the present invention. The embodiment includes a platform 14 upon which material is positioned for cutting and sealing, the material being held in position by a vacuum means including a vacuum system acting through apertures 20 in the platform 14 as previously described. A robotic cutting arm 24 positions a cutter 22 having an ultrasonically driven horn 26 over the platform 14.

Disposed atop the platform 14 is a configured, hardened steel anvil 80. The anvil 80 is configured to match the pattern of a portion to be cut from the material and, in fact, may be cut to match several different patterns or even to cover or form a substantial portion of the surface of the platform 14. The configured anvil 80 may be inlaid into the platform 14 so that its upper surface is substantially coplanar with that of the platform 14, thus enhancing the effectiveness of the vacuum means.

Figure 7:
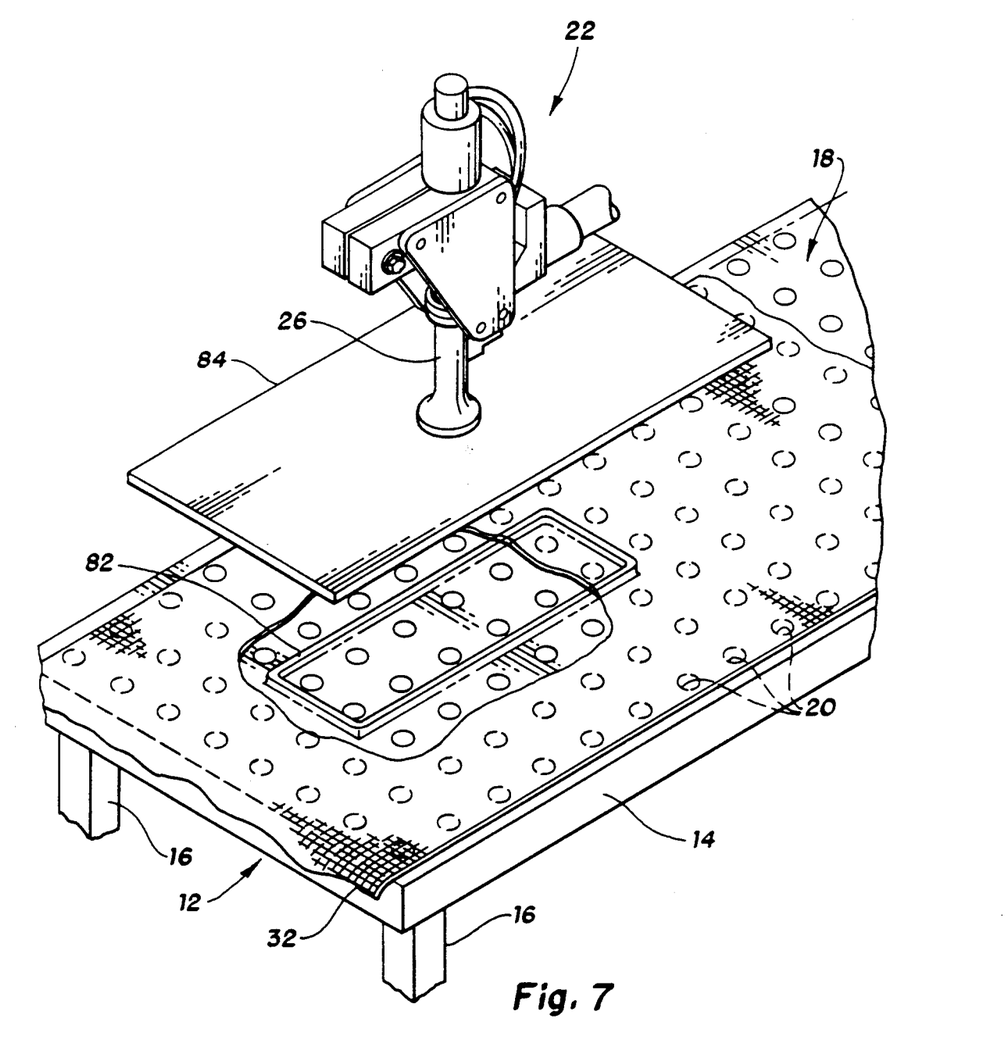
FIG. 7 is a partial, perspective view showing details of yet another embodiment of the present invention.

In another embodiment of the present invention, shown in FIG. 7, the platform 14 has at least one slightly raised, hardened steel energy director, or anvil 82, shaped to match a portion to be cut from the material. In this embodiment, the ultrasonically driven horn 26 used, rather than having a cutting tip, includes a flat plate 84 for simultaneously pressing material (not shown) disposed between the plate 84 and the anvil 82 against all portions of the raised anvil 82 and cutting and sealing the material; and the cutter 22 need have only one degree of freedom and need not be guided along a path coincident with the configuration of the portions to be cut from the material.

Anyone skilled in the art will appreciate the fact that various sensors may find application in the more automated versions of the described embodiments, for example, to provide the controllers 68 with information regarding the amount of material on a reel 56 or 58, the position of material 32 on a platform 14, the amount of cut material stacked in a bin 76, the positions of various mechanisms, and the like.

While the best mode for carrying out the invention has been described in detail, those familiar with the art to which this invention relates will recognize various alternative designs and embodiments for practicing the invention as disclosed by the following claims.

What is claimed is:

1. An apparatus for cutting and sealing the cut edges of fabric material such as that used to manufacture automotive safety air bags, the material being at least partially thermoplastic and being semipermeable to the flow of fluids therethrough, the apparatus comprising:
   a support to position the material for cutting and sealing;
   vacuum means for creating a negative pressure between the material and the support to secure the material to the support and immobilize the material while the latter is being cut and sealed; and
   cutting means for ultrasonically cutting the material and sealing the cut edges to prevent raveling thereof, the cutting means being manually positionable and including a cutter having an ultrasonically driven horn, the horn having a cutting tip, the cutter also having a guide member attached thereto, the guide member and the cutting tip having collinear axes.

2. The apparatus as defined by claim 1, wherein the cutting means further includes an anvil attached thereto in effective apposition to the cutting tip.

3. The apparatus as defined by claim 2, wherein the anvil and the guide member form one integral part.

4. The apparatus as defined by claim 3, wherein the support is a substantially flat, generally horizontal platform.

5. The apparatus as defined by claim 4, wherein the platform includes guiding means for cooperating with the guide member attached to the cutter to guide the cutter in a desired path.

6. The apparatus as defined by claim 5, wherein the platform defines a channel formed therein to receive the guide member attached to the cutter to guide the cutter in a desired path.

7. The apparatus as defined by claim 4, wherein the platform defines a plurality of apertures formed therein, the apertures being connected to a source of vacuum to secure material to the platform to immobilize the material while the latter is being cut and sealed.

8. The apparatus as defined by claim 7 further comprising securing vacuum controlling means for applying vacuum to the apertures whenever material is being cut and sealed.

9. An apparatus for cutting and sealing the cut edges of fabric material such as that used to manufacture automotive safety air bags, the material being at least partially thermoplastic and being semipermeable to the flow of fluids therethrough, the apparatus comprising:
   a support including a substantially flat, generally horizontal platform, to position the material for cutting and sealing;
   vacuum means for creating a negative pressure between the material and the support to secure the material to the support and immobilize the material while the latter is being cut and sealed;
   a cutter having an ultrasonically driven horn with a cutting tip for ultrasonically cutting the material and sealing the cut edges to prevent raveling thereof;

a robotic cutting arm for automatically positioning the cutter, the arm having three degrees of freedom in which to guide the cutter along a two-dimensional cutting path;

cutting arm controlling means for controlling the movement of the robotic cutting arm; and pickup means for temporarily coupling the robotic cutting arm to the portion cut from the material to facilitate removing the latter from the platform.

10. The apparatus as defined by claim 9, wherein the pickup means includes:

at least one pickup member positionable by the robotic cutting arm against the portion cut from the material, the at least one pickup member being connected to a source of vacuum, the vacuum being communicated through an orifice in the pickup member to hold the portion cut from the material against the pickup member; and pickup controlling means for controlling the application of vacuum to the pickup member.

11. The apparatus as defined by claim 10, further including a bin for storing cut portions of material deposited in the bin by the pickup means.

12. An apparatus for cutting and sealing the cut edges of fabric material such as that used to manufacture automotive safety air bags, the material being at least partially thermoplastic and being semipermeable to the flow of fluids therethrough, the apparatus comprising:

a support including a substantially flat, generally horizontal platform, to position the material for cutting and sealing;

vacuum means for creating a negative pressure between the material and the support to secure the material to the support nd immobilize the material while the latter is being cut and sealed;

a cutter having an ultrasonically driven horn with a cutting tip for ultrasonically cutting the material and sealing the cut edges to prevent raveling thereof;

a robotic cutting arm for automatically positioning the cutter, the arm having three degrees of freedom in which to guide the cutter along a two-dimensional cutting path;

cutting arm controlling means for controlling the movement of the robotic cutting arm; and a configured anvil disposed on the platform, the anvil having a shape coincident with a path traced by the cutting tip when cutting material to a desired configuration, a portion of the anvil being in effective apposition to the cutting tip whenever the cutting tip is engaged in cutting.

13. An apparatus for cutting and sealing the cut edges of fabric material such as that used to manufacture automotive safety air bags, the material being at least partially thermoplastic and being semipermeable to the flow of fluids therethrough, the apparatus comprising:

a support including a substantially flat, generally horizontal platform, to position the material for cutting and sealing;

vacuum means for creating a negative pressure between the material and the support to secure the material to the support and immobilize the material while the latter is being cut and sealed;

a cutter having an ultrasonically driven horn with a cutting tip for ultrasonically cutting the material and sealing the cut edges to prevent raveling thereof;

a robotic cutting arm for automatically positioning the cutter, the arm having three degrees of freedom in which to guide the cutter along a two-dimensional cutting path;

cutting arm controlling means for controlling the movement of the robotic cutting arm; and an anvil attached thereto in effective apposition to the cutting tip.

14. An apparatus for cutting and sealing the cut edges of fabric material such as that used to manufacture automotive safety air bags, the material being at least partially thermoplastic and being semipermeable to the flow of fluids therethrough, the apparatus comprising:

a support including a substantially flat, generally horizontal platform, to position the material for cutting and sealing;

vacuum means for creating a negative pressure between the material and the support to secure the material to the support and immobilize the material while the latter is being cut and sealed;

a cutter having an ultrasonically driven horn with a cutting tip for ultrasonically cutting the material and sealing the cut edges to prevent raveling thereof;

a cutter positioning mechanism including:

longitudinal positioning means for horizontally moving the cutter along a longitudinal axis to provide longitudinal components of motion to the cutter;

lateral positioning means for horizontally moving the cutter along a lateral axis to provide lateral components of motion to the cutter, the lateral axis being at right angles to the longitudinal axis; and vertical positioning means for vertically moving the cutter into engagement with material to be cut and out of engagement with the material when cutting has been completed;

the apparatus further including a configured anvil disposed on the platform, the anvil having a shape coincident with a path traced by the cutting tip when cutting material to a desired configuration, a portion of the anvil being in effective apposition to the cutting tip whenever the cutting tip in engaged in cutting.

15. An apparatus for cutting and sealing the cut edges of fabric material such as that used to manufacture automotive safety air bags, the material being at least partially thermoplastic and being semipermeable to the flow of fluids therethrough, the apparatus comprising:

a support including a substantially flat, generally horizontal platform, to position the material for cutting and sealing;

vacuum means for crating a negative pressure between the material and the support to secure the material to the support and immobilize the material while the latter is being cut and sealed;

a cutter having an ultrasonically driven horn with a cutting tip for ultrasonically cutting the material and sealing the cut edges to prevent raveling thereof;

a cutter positioning mechanism including:

longitudinal positioning means for horizontally moving the cutter along a longitudinal axis to provide longitudinal components of motion to the cutter;

lateral positioning means for horizontally moving the cutter along a lateral axis to provide lateral components of motion to the cutter, the lateral axis being at right angles to the longitudinal axis; and vertical positioning means for vertically moving the cutter into engagement with material to be cut and out of engagement with the material when cutting has been completed;

wherein the cutter further includes an anvil attached thereto in effective apposition to the cutting tip.

16. The apparatus as defined by claim 12, 13, 14 or 15, further including a robotic stacking arm having pickup means for temporarily coupling the robotic stacking arm to the portion cut from the material to facilitate removal, from the platform, of the portion cut from the material.

17. The apparatus as defined by claim 16, wherein the pickup means includes:

at least one pickup member positionable by the robotic stacking arm against the portion cut from the material, the at least one pickup member being connected to a source of vacuum, the vacuum being communicated through an orifice in the pickup member to hold the portion cut from the material against the pickup member; and vacuum controlling means for controlling the application of vacuum to the pickup member.

18. The apparatus as defined by claim 17, further including a bin for storing cut portions of material deposited in the bin by the pickup means.

19. An apparatus for cutting and sealing the cut edges of fabric material such as that used to manufacture automotive safety air bags, the material being at least partially thermoplastic and being semipermeable to the flow of fluids therethrough, the apparatus comprising:

a support to position the material for cutting and sealing, the support being a substantially flat, generally horizontal platform;

vacuum means for creating a negative pressure between the material and the support to secure the material to the support and immobilize the material while the latter is being cut and sealed; and cutting means for ultrasonically cutting the material and sealing the cut edges to prevent raveling thereof, the cutting means including:

at least one anvil extending above the surface of the platform and being configured to outline at least one portion to be cut from the material; and a cutter having an ultrasonically driven horn, the horn forming a substantially flat plate configured and positioned to simultaneously press material disposed between the plate and the anvil against all portions of the raised anvil to cut and seal the material.

20. The apparatus as defined by claim 19, further including a cutter controlling means for controlling the movement of the cutter.

21. The apparatus as defined by claim 20, further including a robotic stacking arm having a pickup means for temporarily coupling the robotic stacking arm to the portion cut from the material to facilitate removing the latter from the platform.

22. The apparatus as defined by claim 21, wherein the pickup means includes:

at least one pickup member positionable by the robotic stacking arm against the portion cut from the material, the at least one pickup member being connected to a source of vacuum, the vacuum being communicated through an orifice in the pickup member to hold the portion cut from the material against the pickup member; and pickup controlling means for controlling the movement of the robotic stacking arm and for controlling the application of vacuum to the pickup member to remove the portion cut from the material from the platform.

23. The apparatus as defined by claim 22, further including a bin for storing cut portions of material deposited in the bin by the pickup means.

24. An apparatus for cutting and sealing the cut edges of fabric material such as that used to manufacture automotive safety air bags, the material being at least partially thermoplastic and being semipermeable to the flow of fluids therethrough, the apparatus comprising:

a support to position the material for cutting and sealing;

vacuum means for creating a negative pressure between the material and the support to secure the material to the support and immobilize the material while the latter is being cut and sealed; and cutting means for ultrasonically cutting the material and sealing the cut edges to prevent raveling thereof, a supply reel rotatably mounted proximate a first end of the support to store a quantity of material rolled on the supply reel and to permit material to be pulled from the supply reel for positioning and cutting;

a takeup reel rotatably mounted proximate a second end of the support to receive and store material remaining after a desired portion has been cut therefrom;

a motor to rotate the takeup reel to pull uncut material from the supply reel, to position the uncut material on the support, and to wind material remaining onto the takeup reel for storage;

motor controlling means for initiating and terminating the operation of the motor;

an anvil disposed between the supply reel and the support; and at least one cutter having an ultrasonically driven horn disposed to impinge the anvil to cut and seal cut edges of material being pulled from the supply reel by the takeup reel to cut the material into a desired number of strips of predetermined widths before the material is positioned on the support.

25. The apparatus as defined by claim 24, wherein the anvil is an elongate cylinder having a longitudinal axis, the anvil being rotatable about the axis and being disposed between the supply reel and the support, the axis being substantially horizontal and at right angles to the direction of movement of the material between the supply reel and the takeup reel.

26. The apparatus as defined by claim 6, 12, 13, 14, 15, 19 or 25, further including feeding means for feeding material onto the support to position the material for cutting.

27. The apparatus as defined by claim 26, wherein the feeding means comprises:

a supply reel rotatably mounted proximate a first end of the support to store a quantity of material rolled on the supply reel and to permit material to be pulled from the supply reel for positioning and cutting;

a takeup reel rotatably mounted proximate a second end of the support to receive and store material remaining after a desired portion has been cut therefrom; and drive means for rotating the takeup reel to pull uncut material from the supply reel, to position the uncut material on the support, and to wind material remaining onto the takeup reel for storage.

28. The apparatus as defined by claim 27, wherein the drive means includes:

a motor to rotate the takeup reel; and motor controlling means for initiating and terminating the operation of the motor.

29. The apparatus as defined by claim 14, 15 or 25, further including a robotic stacking arm having pickup means for temporarily coupling the robotic stacking arm tot he portion cut from the material to facilitate removing the latter from the platform.

30. The apparatus as defined by claim 29, wherein the pickup means includes:

at least one pickup member positionable by the robotic stacking arm against the portion cut from the material, the at least one pickup member being connected to a source of vacuum, the vacuum being communicated through an orifice in the pickup member to hold the portion cut from the material against the pickup member; and pickup controlling means for controlling the movement of the robotic stacking arm and for controlling the application of vacuum to the pickup member to remove the portion cut from the material from the platform.

31. The apparatus as defined by claim 30, further including a bin for storing cut portions of material deposited in the bin by the pickup means.

32. The apparatus as defined by claim 25, wherein the at least one cutter is adjustable along the elongate anvil in the direction of the axis of the anvil.

33. A method for cutting and sealing the cut edges of fabric material, such as that used to manufacture automotive safety air bags, with an ultrasonic cutter having a cutting tip, the material being at least partially thermoplastic, being semipermeable to the flow of fluids therethrough, and being disposed for cutting and sealing atop a platform, the method comprising the steps of:

(a) supporting the material on the platform in position for cutting and sealing;

(b) securing the material to the platform by applying a negative pressure between the material and the platform;

(c) providing a robotic arm for automatically positioning the cutter, the arm having three degrees of freedom in which to guide the cutter along a two-dimensional cutting path;

(d) providing cutting arm controlling means for controlling the movement of the robotic cutting arm;

(e) providing an anvil disposed in apposition to the cutting tip;

(f) positioning the cutter to sandwich the material between the cutting tip of the cutter and the anvil;

(g) energizing the cutter so that the cutting tip vibrates at an ultrasonic frequency against the anvil, cutting the material therebetween and heating it sufficiently to melt thermoplastic material in the cut edges to prevent raveling thereof; and (h) guiding, with the control means, the cutter along a defined path in the material while cutting and sealing the cut edges.

34. The method as defined by claim 33, further including the step of removing the portion cut from the material.

35. A system for cutting and sealing the cut edges of fabric material, such as that used to manufacture automotive safety air bags, with an ultrasonic cutter having a cutting tip, the cutting tip being positionable in apposition to an anvil, the material being at least partially thermoplastic, being semipermeable to the flow of fluids therethrough, and being disposed for cutting and sealing atop a platform, the system comprising:

means for supporting the material on the platform in position for cutting and sealing;

means for securing the material to the platform by applying a negative pressure between the material and the platform;

a robotic arm for automatically positioning the cutter, the arm having three degrees of freedom in which to guide the cutter along a two-dimensional cutting path;

an anvil disposed in apposition to the cutting tip;

means for positioning the cutter to sandwich the material between the cutting tip of the cutter and the anvil;

means for energizing the cutter so that the cutting tip vibrates at an ultrasonic frequency against the anvil, cutting the material therebetween and heating it sufficiently to melt thermoplastic material in the cut edges to prevent raveling thereof; and means for guiding the cutter along a defined path while cutting and sealing the material.

36. The system as defined by claim 35, further including means for removing the portion cut from the material.

* * * * *